Patented July 6, 1926.

1,591,752

UNITED STATES PATENT OFFICE.

WILLIAM PROCTOR FERGUSON, OF BROOKLYN, NEW YORK.

METHOD OF TREATING WOOD.

No Drawing.  Application filed May 13, 1925. Serial No. 30,086.

This invention relates to improvements in the method and composition for fireproofing wood and has for an object to provide improved steps for applying a fireproofing compound to either large or small pieces of wood so that the wood will be properly treated throughout.

Another object of the invention is to provide a fireproofing compound for wood wherein a composition is provided that is comparatively inexpensive and yet which may be readily applied to either large or small articles and effectively act on the wood to make the same substantially fireproof.

In providing a compound embodying the invention, various substitutes or derivatives may be used without departing from the spirit of the invention. It is aimed, however, to use a solution of alkali in combination with an acid for a preliminary treatment and then subject the article to a solution of hydraulic cement. When treating a piece of wood, as for instance, an ordinary wood shingle, the same is first submerged in a solution produced by mixing three parts water, one part chloride of sodium and two parts silicic acid. The proportion of the various parts may be varied to a large extent without departing from the spirit of the invention but when the proportion of acid and soda is reduced, the time of submergence of the article of wood must be longer. With the proportion above stated, usually a submergence of one and one-half minutes is sufficient, after which, the wood article is removed and allowed to dry under ordinary atmospheric conditions. After the article of wood has dried, it is again submerged in a solution of water and hydraulic cement, which solution is preferably fifty per cent water and fifty per cent cement, though if desired, other proportions might be used. After the article of wood has been submerged for about a minute and a half in this solution, it is removed and allowed to dry and after having been dried under ordinary atmospheric conditions it is ready for use. The submerging of the article of wood in the first solution will permit the solution to penetrate the wood to a large extent and also form a surface for the reception of the cement so that when the article of wood is submerged in the second solution a thin coating of cement is evenly distributed over the article of wood, said cement adhering firmly to the coating produced by the first solution.

In forming the first solution, if desired, commercial water glass might be used which is a composition of silicic acid and carbonate of soda. It is also to be understood that either chloride of sodium or carbonate of sodium could be used. When using hydraulic cement, any suitable cement might be used, such as Portland cement, plaster Paris, or sulphate of potassium. It is also understood that any suitable alkali might be used or its derivatives, such as sodium carbonate, silicic acid or any metallic salts, such as chloride of sodium. Any of the different forms of alkali will act to produce a desired coating on the wood while any of the hydraulic cements mentioned or any others desired might be used to produce the fireproofing coating which will firmly adhere to the first coating. By placing the wood first in an alkali and acid bath and then subjecting the same to a hydraulic cement bath, the wood is not only made substantially fireproof but also waterproof.

What I claim is:

1. The method of fireproofing and waterproofing an article of wood, comprising applying a preliminary coating by submerging the article of wood in a solution of silicic acid, carbonate of soda and water from one to two minutes, removing and allowing to dry, applying a final coating by submerging said article of wood in a solution of water and hydraulic cement for from one to two minutes, and finally removing and allowing to dry under atmospheric conditions.

2. The method of preserving, fireproofing and waterproofing wood consisting in coating the wood with a preserving compound having silicic acid as one of its constituent parts, and then applying a second coating consisting of a solution of hydraulic cement having approximately fifty per cent water and fifty per cent cement.

3. The method of fireproofing and waterproofing an article of wood, comprising applying a coating to the wood which will partly penetrate the wood, and then applying a cement covering coating on top of the first mentioned coating, said coatings being of such material that the cement coating will interlock with the first coating.

WILLIAM PROCTOR FERGUSON.